United States Patent
Iritani (10) Patent No.: US 6,874,330 B2
(45) Date of Patent: Apr. 5, 2005

(54) AIR CONDITIONER FOR HYBRID VEHICLE (75) Inventor: Kunio Iritani, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/674,624

(22) Filed: Sep. 30, 2003

(65) Prior Publication Data
US 2004/0069000 A1 Apr. 15, 2004

(30) Foreign Application Priority Data
Oct. 15, 2002 (JP) ........................................ 2002-300500

(51) Int. Cl.[7] ................................................. B60H 1/32
(52) U.S. Cl. ........................... 62/236; 62/244; 62/323.1
(58) Field of Search ....................... 62/236, 244, 323.1, 62/323.3

(56) References Cited

U.S. PATENT DOCUMENTS

| 6,230,507 B1 | * | 5/2001 | Ban et al. ................... 62/228.4 |
| 6,515,448 B2 | * | 2/2003 | Iritani et al. ................. 320/104 |
| 6,530,426 B1 | * | 3/2003 | Kishita et al. ............... 165/202 |
| 6,688,120 B2 | * | 2/2004 | Aoki et al. ..................... 62/133 |
| 2002/0112489 A1 | * | 8/2002 | Egawa et al. .................. 62/133 |
| 2002/0124580 A1 | * | 9/2002 | Suitou et al. .................. 62/133 |

* cited by examiner

Primary Examiner—William E. Tapolcai
(74) Attorney, Agent, or Firm—Harness, Dickey & Pierce, PLC (57) ABSTRACT In an air conditioner for a hybrid vehicle, an air conditioning unit performs air-conditioning operation by electrical power supplied from a battery. When a residual charging degree of the battery becomes equal to or lower than a target degree, an electrical motor generator is driven by a vehicle engine so that the battery is charged through the electrical motor generator. Further, when a rotation speed of the engine is lower than a predetermined speed or when a power generation efficiency due to the engine is lower than a predetermined efficiency, air-conditioning capacity of the air conditioning unit is set lower, so that a consumption power of the air conditioner is restricted. Accordingly, the frequency for starting the engine only for charging the battery can be reduced.

9 Claims, 7 Drawing Sheets

AIR CONDITIONER FOR HYBRID VEHICLE

CROSS-REFERENCE TO RELATED APPLICATION

This application is related to and claims priority from Japanese Patent Application No. 2002-300500 filed on Oct. 15, 2002, the content of which is hereby incorporated by reference.

BACKGROUND OF THE INVENTION

1. Field of the Invention

The present invention relates to an air conditioner for a hybrid vehicle having an engine and an electrical motor for running the vehicle.

2. Description of Related Art

In a conventional hybrid vehicle disclosed in JP-A-2000-270401, there is provided with an air conditioning unit for performing air-conditioning operation in a passenger compartment by using electrical power supplied from a battery. Further, when a residual charging degree of the battery becomes equal to or lower than a charging-starting target value (target degree), the battery is charged by driving a generator using a vehicle engine. While the vehicle is stopped or runs with a low load, the engine is stopped when the residual charging degree of the battery is higher than the charging target value.

However, in the above-described air conditioning unit, the battery is charged only when the residual charging degree becomes equal to or lower than the target degree, regardless the operation state of the engine. Therefore, even in a case where the vehicle is running while the engine is stopped, the operation of the engine is started only for charging the battery when the residual charging degree becomes equal to or lower than the target degree. When the vehicle engine is frequently driven only for charging the battery as in this manner, fuel consumption efficiency cannot be sufficiently improved.

SUMMARY OF THE INVENTION

In view of the above problems, it is an object of the present invention to provide an air conditioner for a hybrid vehicle, which sufficiently improves fuel consumption efficiency.

It is another object of the present invention to reduce frequency for driving an engine, only for charging a battery, in an air conditioner for a hybrid vehicle where the engine is controlled to be driven and stopped according to a vehicle running condition.

According to the present invention, an air conditioner is used for a hybrid vehicle having an engine for running the vehicle, an electrical motor generator for running the vehicle and for generating electrical power, and a battery for supplying electrical power to the electrical motor generator. The air conditioner includes an air conditioning unit for performing air-conditioning operation in a passenger compartment of the vehicle by using electrical power supplied from the battery, and a control unit for controlling operation of the air conditioning unit. In the air conditioner, when a residual charging degree of the battery becomes equal to or lower than a target degree, the electrical motor generator is driven by the engine to charge the battery. Further, when a rotation speed of the engine is equal to or lower than a predetermined rotation speed, the control unit decreases an air-conditioning capacity of the air conditioning unit, as compared with a case where the rotation speed of the engine is higher than the predetermined rotation speed. Accordingly, the frequency for starting the engine only for charging the battery becomes lower.

When the rotation speed of the engine decreases, the efficiency of the engine decreases, and therefore, a power generation efficiency due to the engine is decreased. Accordingly, in the present invention, when a power generation efficiency due to the engine is equal to or lower than a predetermined efficiency, the control unit decreases air-conditioning capacity of the air conditioning unit, as compared with a case where the power generation efficiency due to the engine is higher than the predetermined efficiency. Therefore, the frequency, for increasing the engine rotation speed in order to increase the power generation efficiency for charging, can be reduced. Thus, fuel consumption efficiency in the engine 1 can be improved, and vibration noise and the exhaust amount of environmental polluting matter at the engine start time can be reduced.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
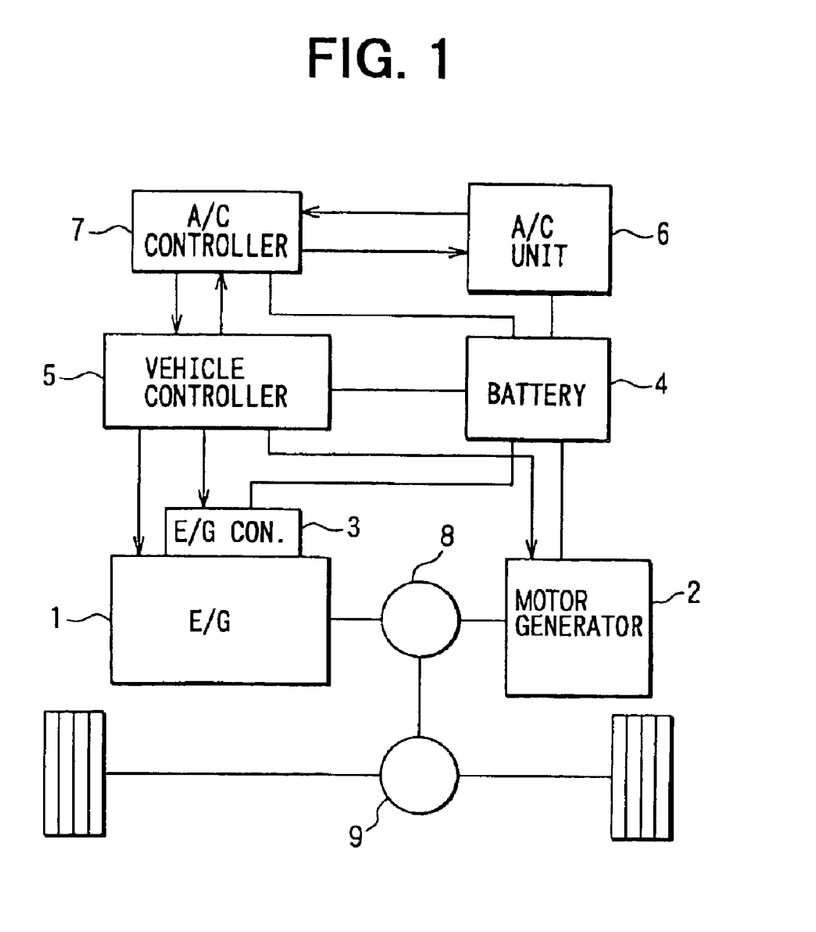
FIG. 1 is a schematic diagram showing a hybrid vehicle on which an air conditioner according to a first embodiment of the present invention is mounted.

A first embodiment of the present invention will be now described with reference to FIGS. 1–7. As shown in FIG. 1, a hybrid vehicle includes an internal combustion engine 1 using gasoline as a fuel, an electrical motor generator 2, an engine controller 3, a battery (e.g., nickel-hydrogen storage battery) 4 and a vehicle controller 5.

The electrical motor generator 2 has an electrical motor function for running the hybrid vehicle and a power generator function for generating electrical power. That is, when electrical power is supplied to the electrical motor generator 2 from the battery 4, the electrical motor generator 2 is operated as an electrical motor for generating motive power. On the other hand, when the electrical motor generator 2 is driven by the engine 1 or the like, the electrical motor generator 2 is operated as a power generator for generating electrical power.

The engine controller 3 suitably controls an amount of fuel supplied to the engine 1, an ignition timing and the like based on control signals from the vehicle controller 5, so that a rotation speed of the engine 1 and torque thereof can be controlled at target values, and high fuel-combustion efficiency can be obtained in the engine 1. The battery 4 supplies electrical power to the electrical motor generator 2, the engine controller 3, an air-conditioning unit 6 and the like. The vehicle controller 5 outputs control signals to the engine controller 3 while controlling the electrical motor generator 2 and a motive-power switching mechanism 8.

The motive-power switching mechanism 8 has a function for switching a transmission direction of motive power between the engine 1, the electrical motor generator 2 and a vehicle shaft 9. Specifically, the motive-power switching mechanism 8 can selectively switch between a state where only the power of the engine is transmitted to the vehicle shaft 9, a state where only the power of the electrical motor generator 2 to the vehicle shaft 9, a state where both the power of the engine 1 and the power of the electrical motor generator 2 are transmitted to the vehicle shaft 9, a state where the power of the engine 1 is transmitted to the electrical motor generator 2 and the vehicle shaft 9, and a state where the power of the engine 1 is transmitted only to the electrical motor generator 2.

The following control is basically performed by the vehicle controller 5. First, while the vehicle is stopped, the engine 1 is stopped. On the other hand, while the vehicle runs, the engine 1 is controlled to be started or stopped according to a vehicle running state (mainly, a vehicle speed and a running load). This control is performed in all embodiments in the present specification. Here, the running load is obtained from a pedaled amount of an accelerator pedal, for example. When the engine 1 is required to be driven, the engine 1 is started by the vehicle controller 5 using the electrical motor generator 2. In order to obtain certain driving force required for running the hybrid vehicle, the electrical motor generator 2 is controlled to be driven or stopped (e.g., inverter-controlling), and a rotation speed thereof and the like are controlled by the vehicle controller 5. Further, a target rotation speed of the engine 1, a target torque thereof and the like are outputted to the engine controller 3 from the vehicle controller 5.

The motive-power switching mechanism 8 is controlled by the vehicle controller 5, and only the motive power of the electrical motor generator 2 is transmitted to driving wheels of the hybrid vehicle when the vehicle is started and when the vehicle runs at a low speed or in a low load state. When the vehicle runs at a stable speed (at a medium speed or in a medium load state), only the motive power of the electrical motor generator 2 or the motive power of both the engine 1 and the electrical motor generator 2 can be transmitted to the driving wheels. When the vehicle runs at a high speed or in a high load state, the motive power of both the engine 1 and the electrical motor generator 2 is transmitted to the driving wheels. When the vehicle decelerates, the electrical motor generator 2 is driven using the motive power from the driving wheels while the engine 1 is stopped, so that the battery 4 is charged by the electrical motor generator 2.

When a residual charging degree of the battery 4 becomes equal to or smaller than a target degree for starting the charging of the battery 4, the engine 1 is driven, and the motive power of the engine 1 is transmitted to the electrical motor generator 2 through the motive-power switching mechanism 8. In this case, the electrical motor generator 2 is operated as a power generator, and the battery 4 is charged by the electrical motor generator 2.

The air conditioner includes an air conditioning unit 6 for performing air-conditioning control in a passenger compartment of the vehicle and the air-conditioning controller 7 for controlling components of the air conditioning unit 6. In the first embodiment, the air conditioner is an automatic-controlled air conditioner where the temperature in the passenger compartment is automatically controlled at a temperature set arbitrarily.

Figure 2:
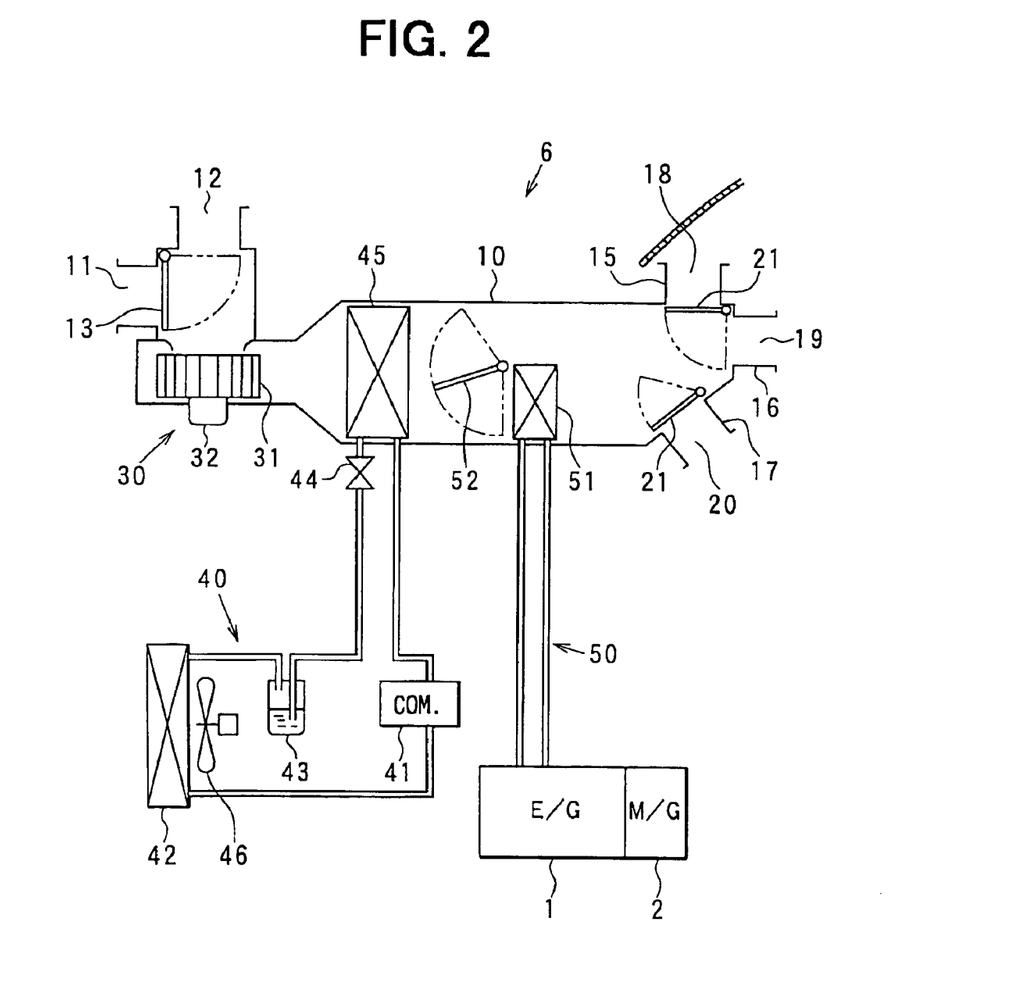
FIG. 2 is a schematic diagram showing an entire structure of the air conditioner according to the first embodiment.

As shown in FIG. 2, the air conditioning unit 6 is disposed in the passenger compartment at a front side. The air conditioning unit 6 includes an air-conditioning duct 10 defining an air passage through which air is introduced into the passenger compartment, a centrifugal type blower 30 for blowing air in the air-conditioning duct 10, a refrigerant cycle system 40, a cooling water circuit 50 and the like. The refrigerant cycle system 40 is disposed to cool air flowing through the air-conditioning duct 10. An inside/outside air switching box, disposed at the most upstream air side of the air-conditioning duct 10, includes an inside air suction port 11 from which inside air inside the passenger compartment is introduced, and an outside air suction port 12 from which outside air outside the passenger compartment is introduced. These suction ports 11, 12 are opened and closed by an inside/outside air switching damper 13, and the inside/outside air switching damper 13 is driven by an actuator 14 such as a servomotor.

At the most downstream air side of the air-conditioning duct 10, a defroster opening portion, a face opening portion and a foot opening portion are provided. A defroster duct 15 is connected to the defroster opening portion, and a defroster air outlet port 18, through which conditioned air is blown toward an inner surface of a vehicle windshield, is provided at the most downstream air end of the defroster duct 15. A face duct 16 is connected to the face opening portion, and a face air outlet port 19, through which conditioned air is blown toward the upper half body of a passenger, is provided at the most downstream air end of the face duct 16. A foot duct 17 is connected to the foot opening portion, and a foot air outlet port 20, through which conditioned air is blown to the foot portion of the passenger, is provided at the most downstream air end of the foot duct 17. Two switching dampers 21, driven by actuators 22, respectively, are rotatably provided for the air outlet ports 18–20. Thus, the switching dampers 21 can switch one air outlet mode among a face mode, a bi-level mode, a foot mode, a foot/defroster mode and a defroster mode.

The blower 30 includes a centrifugal fan 31 rotatably disposed in a scroll case integrated with the air-conditioning duct 10, and a blower motor 32 for driving the centrifugal fan 31. A blown air amount (rotation speed of the centrifugal fan 31) is controlled in accordance with a blower voltage applied to the blower motor 32 through a blower driving circuit 33.

The refrigerant cycle system 40 includes an electrical compressor 41, a condenser 42, a gas-liquid separator 43, an expansion valve 44, an evaporator 45, a cooling fan 46 for blowing outside air to the condenser 42, refrigerant piping for connecting these, and the like. The electrical compressor 41 includes a motor for driving a compression mechanism using an electrical power from the battery 4. The condenser 42 is disposed to condense refrigerant by performing a heat exchange between compressed refrigerant and outside air.

The gas-liquid separator 43 is disposed to separate the condensed refrigerant from the condenser 42 into gas refrigerant and liquid refrigerant, so that only the liquid refrigerant flow to a downstream refrigerant side. The expansion valve 44 decompresses and expands the liquid refrigerant from the gas-liquid separator 43, and the evaporator 45 is disposed to perform a heat exchange between the decompressed refrigerant from the expansion valve 44 and air passing through the air-conditioning duct 10. An alternating-current (AC) voltage is applied to the motor of the electrical compressor 41 through an inverter 47, and the inverter 47 adjusts a frequency of the AC voltage based on an instruction from the air-conditioning controller 7. Thus, a rotation speed of the electrical compressor 41 can be continuously changed.

A heater core 51 is disposed in the cooling water circuit 50 in which engine-cooling water (hot water) of the engine 1 is circulated by a water pump (not shown). The heater core 51 performs an heat exchange between the engine-cooling water and air so that air passing through the heater core 51 is heated. The heater core 51 is disposed in the air-conditioning duct 10 at a downstream air side of the evaporator 45 so as to partly cross the air passage in the air-conditioning duct 10. An air mixing damper 52, driven by an actuator 53 such as a servomotor, is rotatably disposed at an upstream air side of the heater core 51. The air mixing damper 52 adjusts a ratio of an air amount passing through the heater core 51 and an air amount bypassing the heater core 51, so as to adjust a temperature of air to be blown into the passenger compartment.

Next, a control system of the first embodiment will be described with reference to FIGS. 1, 3 and 4. Into the air-conditioning controller 7, communication signals from the vehicle controller 5, switch signals from plural switches provided on a control panel 60 in the passenger compartment, and sensor signals from plural sensors are input.

Figure 4:
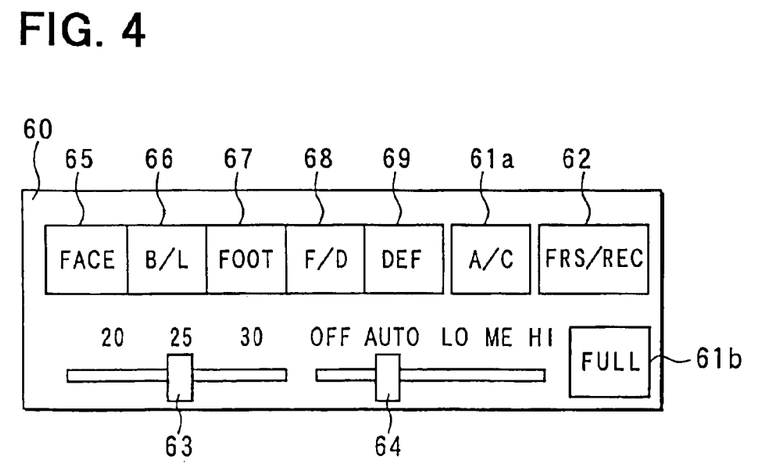
FIG. 4 is a plan view showing a control panel shown in FIG. 3.

As shown in FIG. 4, the plural switches provided on the control panel 60 includes an air-conditioning switch 61a, a full switch 61b, a suction-port changing over switch 62, a temperature setting lever 63, an air amount changing over switch 64, an air-outlet mode changing over switch and the like. The air-conditioning switch 61a is disposed to start and stop an operation of the refrigerant cycle system 40 (electrical compressor 41). The full switch 61b selects any one of a full mode where an air-conditioning control is performed while an amenity in the passenger compartment is mainly improved, and an economy mode where the air-conditioning control is performed while fuel-economical property (fuel consumption efficiency) is mainly improved. The suction-port changing over switch 62 switches an air suction mode, and the temperature setting lever 63 sets a temperature in the passenger compartment at a requested temperature. The air-amount changing over switch 64 switches an amount of air blown by the centrifugal fan 31, and the air-outlet mode changing over switch switches an air outlet mode. The air-outlet mode changing over switch include a face switch 65 for setting a face mode, a bi-level switch 66 for setting a bi-level mode, a foot switch 67 for setting a foot mode, a foot/defroster switch 68 for setting a foot/defroster mode and a defroster switch 69 for setting a defroster mode.

Figure 3:
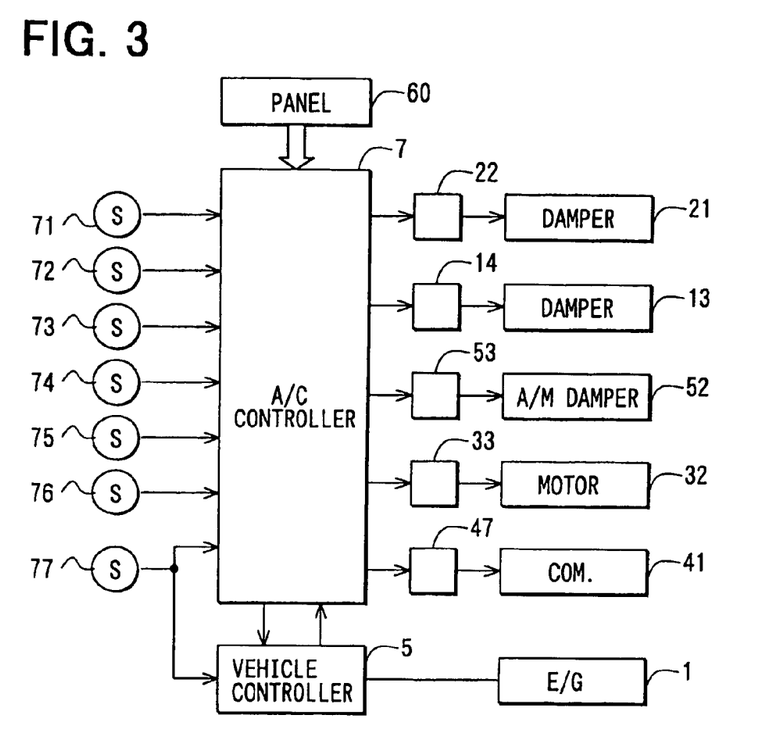
FIG. 3 is a block diagram showing a control unit of the air conditioner according to the first embodiment.

As shown in FIG. 3, the plural sensors include an inside air temperature sensor 71, an outside air temperature sensor 72, a solar radiation sensor 73, an evaporator air suction temperature sensor 74, an evaporator air blow temperature sensor 75, a water temperature sensor 76, a speed sensor 77 and the like. The inside air temperature sensor 71 detects an air temperature in the passenger compartment, and the outside air temperature sensor 72 detects an air temperature outside the passenger compartment. The solar radiation sensor 73 detects an amount of sunlight radiated into the passenger compartment. The evaporator suction air temperature sensor 74 detects a temperature (evaporator suction temperature) TIN of air flowing into the evaporator 45, and the evaporator air blow temperature sensor 75 detects a temperature of air immediately after flowing through the evaporator 45. The water temperature sensor 76 detects a temperature of cooling water flowing into the heater core 51, and the speed sensor 77 detects a vehicle speed. Thermistors can be used as the inside air temperature sensor 71, the outside air temperature sensor 72, the evaporator suction air temperature sensor 74, the evaporator air blow temperature sensor 75 and the water temperature sensor 76, among the above sensors.

The air-conditioning controller 7 includes a microcomputer (not shown) composed of a central processing unit (CPU), a read only memory (ROM), a random access memory (RAM) and the like. Sensor signals from the sensors 71–77 are converted from analog signals to digital signals by an input circuit (not shown) within the air-conditioning controller 7. Thereafter, the digital signals are inputted into the microcomputer.

Figure 5:
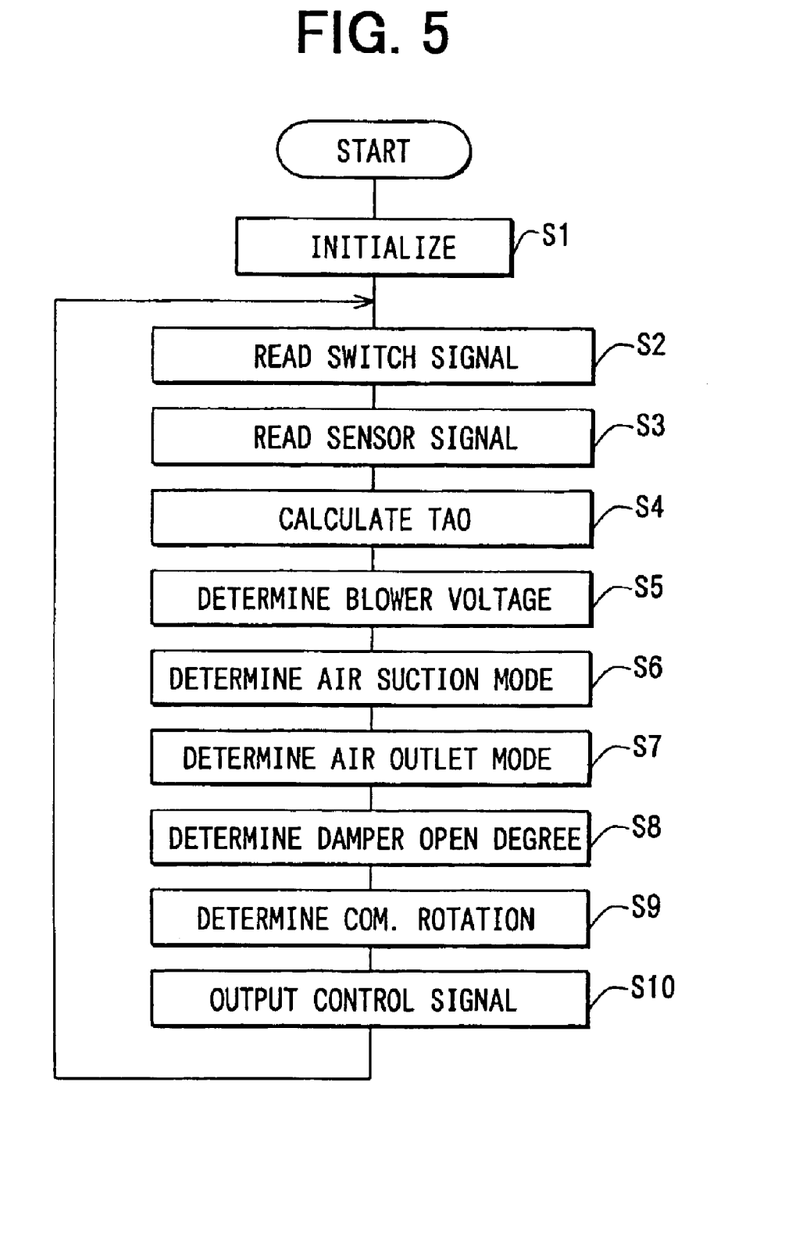
FIG. 5 is a flow diagram showing basic control processes of the air conditioning controller (A/C controller) shown in FIG. 1.
Figure 6:
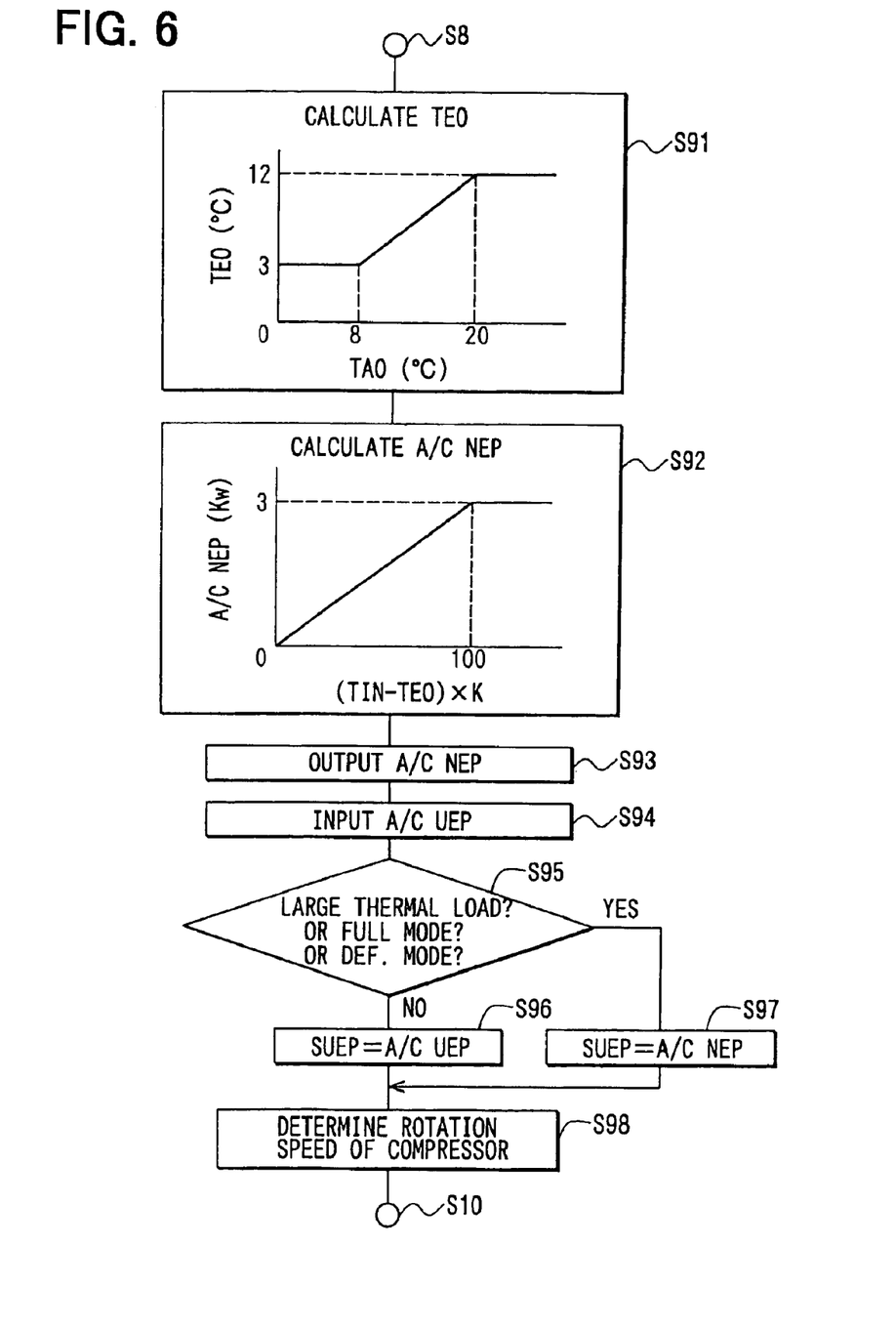
FIG. 6 is a flow diagram showing a detail control at step S9 in FIG. 5, according to the first embodiment.

Next, control processes of the air-conditioning controller 7 will be described with reference to FIGS. 5 and 6. When the ignition switch is turned on, a direct-current electrical power is applied to the air-conditioning controller 7, and a control routine shown in FIG. 5 is started. First, initial setting is performed at step S1. Next, at step S2, the air-conditioning controller 7 reads the switch signals from the switches such as the temperature setting lever 63. At step S3, the air-conditioning controller 7 reads the sensor signals, from the inside air temperature sensor 71, the outside air temperature sensor 72, the solar radiation sensor 73, the evaporator air suction temperature sensor 74, the evaporator air blow temperature sensor 75, the water temperature sensor 76 and the speed sensor 77, converted from analog signals to digital signals.

At step S4, a target temperature TAO of air to be blown into the passenger compartment is calculated based on the following formula (1) beforehand stored in the ROM.

$$TAO = Kset \times Tset - KR \times TR - KAM \times TAM - KS \times TS + C \qquad (1)$$

Wherein, Tset indicates a temperature set by the temperature setting lever 63, TR indicates an inside air temperature detected by the inside air temperature sensor 71, TAM indicates an outside air temperature detected by the outside air temperature sensor 72, and TS indicates a solar radiation amount detected by the solar radiation sensor 73. Kset, KR, KAM and KS indicate gain coefficients, respectively, and C indicates a correction constant.

At step S5, a blower voltage (applied to the blower motor 32) corresponding to the target air temperature TAO is determined using a characteristic view beforehand stored in the ROM. Specifically, as the target air temperature TAO becomes lower than the set temperature or higher than that, the blower voltage is made higher (air amount is increased). On the other hand, as the target air temperature TAO becomes close to the set temperature, the blower voltage is made lower.

Next, at step S6, an air suction mode corresponding to the target air temperature TAO is determined using the characteristic view beforehand stored in the ROM. Specifically, when the target air temperature TAO is low, an inside air circulation mode is selected. When the target air temperature TAO is high, an outside air introduction mode is selected. At step S7, an air outlet mode corresponding to the target air temperature TAO is determined using the characteristic view beforehand stored in the ROM. Specifically, when the target air temperature TAO is low, the foot mode is selected. As the target air temperature TAO becomes higher, the air outlet mode is selected from the foot mode to the face mode through the bi-level mode.

At step S8, an open degree of the air mixing damper 52 is determined in accordance with the target air temperature TAO, the evaporator air temperature detected by the evaporator air blow temperature sensor 75, the cooling water temperature detected by the water temperature sensor 76 and the like. At step S9, a sub-routine shown in FIG. 6 is called, and the rotation speed of the electrical compressor 41 is determined when the air-conditioning switch 61a is turned on. At step S10, control signals are outputted to the actuators 14, 22, 53, the blower circuit 33 and the inverter 47 so as to obtain each of control states calculated or determined at steps S4–S9.

Next, operation of the air conditioner will be now described. While air blown by the blower 30 in the air duct 10 flows through the evaporator 45 in the refrigerant cycle system 40, air is heat-exchanged with refrigerant and is cooled. Here, the rotation speed of the electrical compressor 41 is controlled by the air-conditioning controller 7, so that an amount of refrigerant, flowing in the refrigerant cycle system 40, is controlled and the cooling performance of the refrigerant cycle system 40 is adjusted.

When air cooled in the evaporator 45 flows through the heater core 51 in the cooling water circuit 50, air is heat-exchanged with engine-cooling water and is heated. In addition, the ratio of air flowing through the heater core 51 and air bypassing the heater core 51 is adjusted by an operation position of the air mixing damper 52. Thus, the conditioned air adjusted at a predetermined temperature is blown from one or two of the air outlet ports 18–20 into the passenger compartment.

Next, detail control of the rotation speed of the electrical compressor 41 will be now described with reference to FIG. 6. At step S91, a target evaporator air temperature TEO blown from the evaporator 45, corresponding to the target air temperature TAO, is calculated. At this step, when the full mode is selected by the full switch 61b, the target evaporator air temperature TEO is determined based on a characteristic view shown at step S91. On the other hand, when the economy mode is selected by the full switch 61b, the target evaporator air temperature TEO is set higher than that in the full mode.

At step S92, an air-conditioning necessary electrical power (A/C NEP), originally required in the air-conditioning unit 6 for reducing the evaporator suction air temperature TIN to the target evaporator air temperature TEO, is calculated using a constant K. The constant K is determined by the target evaporator air temperature TEO, the evaporator suction air temperature TIN and the air amount blown from the blower 30. Here, as the rotation speed of the electrical compressor 41 becomes higher, cooling performance of the refrigerant cycle system 40 is improved. Therefore, as a temperature difference between the evaporator suction air temperature TIN and the target evaporator air temperature TEO increases, the air-conditioning necessary electrical power NEP is increased.

At step S93, the air-conditioning necessary electrical power NEP calculated at step S92 is output to the vehicle controller 5. Next, at step S94, an air-conditioning usable electrical power (A/C UEP, described later in detail) calculated by the vehicle controller 5 is inputted to the air-conditioning controller 7.

At step S95, it is determined whether an air-conditioning heat load (thermal load) is large, or it is determined whether the full mode is selected, or it is determined whether the defroster mode is selected. The air-conditioning heat load becomes large, at a time immediately after starting a heating operation or a cooling operation (warming up time or cooling down time), or at a time where an outside air temperature is high while the outside air introduction mode is selected.

At step S95, when the air-conditioning heat load is determined to be high, or when the full mode is determined to be selected, or when the defroster mode is determined to be selected, the determination result is "YES". In this case, the control process proceeds to step S97, and a set usable electrical power SUEP is set at the air-conditioning necessary electrical power (A/C NEP). The set usable electrical power SUEP is a control value of electrical power usable for the air conditioning unit 6. That is, in this case, the air-conditioning capacity of the air conditioning unit 6 is not reduced. Next, at step S98, the rotation speed of the electrical compressor 41 is determined based on the set usable electrical power SUEP. At step S95, when the air-conditioning heat load is not determined to be high, when the full mode is not selected, and when the defroster mode is not selected, the determination result is "NO". In this case, the control process proceeds to step S96, and the set usable electrical power SUEP is set at the air-conditioning usable electrical power (A/C UEP). Thereafter, at step S98, the rotation speed of the electrical compressor 41 is determined based on the set usable electrical power SUEP. In the first embodiment, generally, the usable electrical power UEP for the air-conditioning unit 6 is set to be equal to or smaller than the necessary electrical power NEP. Therefore, the air-conditioning capacity of the air conditioning unit 6 is reduced at step S96.

Next, the control processes related to the air-conditioning control, in the vehicle controller 5, will be now described with reference to FIG. 7. Within the vehicle controller 5, a microcomputer (not shown) composed of a CPU, a ROM, a RAM and the like is provided. A sensor signal from the speed sensor 77 is converted from an analog signal to a digital signal by an input circuit (not shown) within the vehicle controller 5. Thereafter, the digital signal is inputted into the microcomputer of the vehicle controller 5.

Figure 7:
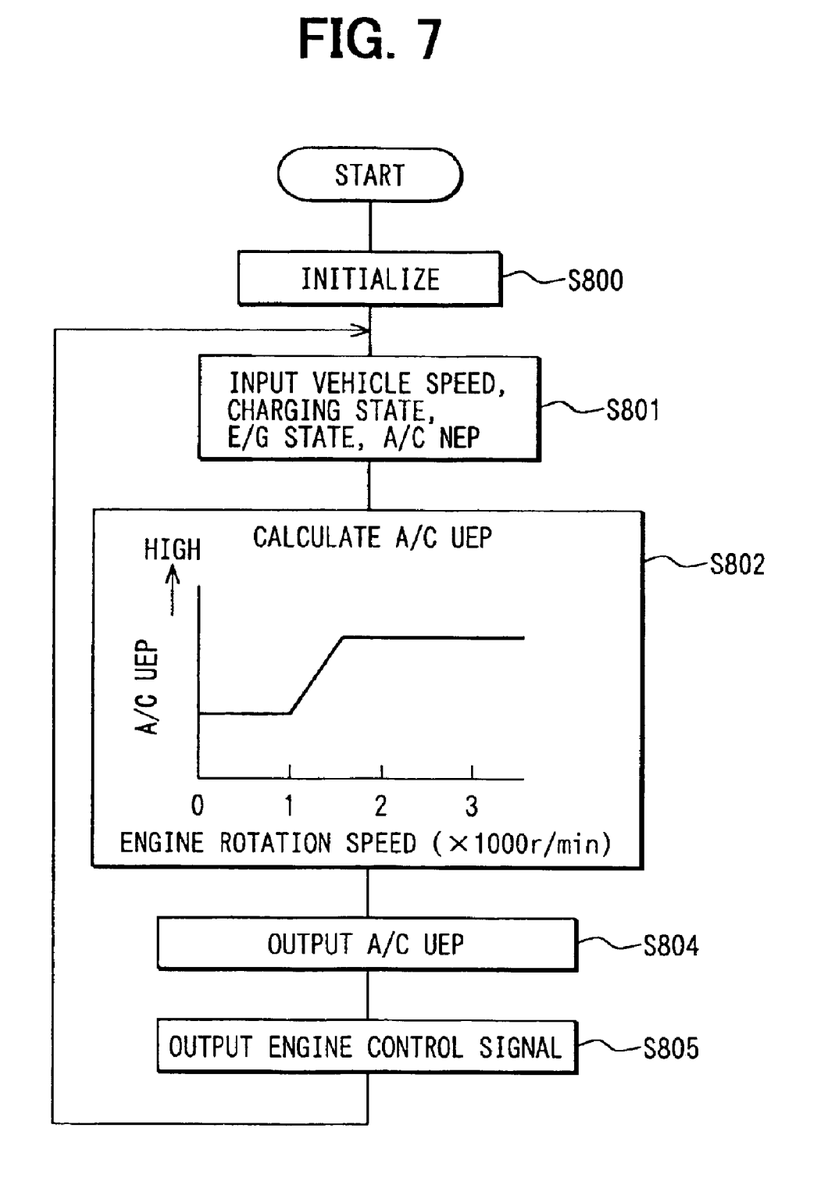
FIG. 7 is a flow diagram showing control processes related to air-conditioning control in the air controller shown in FIG. 1.

When the ignition switch is turned on, direct-current electrical power is supplied to the vehicle controller 5, a control routine shown in FIG. 7 is started, and initial setting is performed at step S800. At step S801, the vehicle speed is calculated based on the signal from the speed sensor 77, and a charging state (e.g., residual charging degree) of the battery 4 is calculated based on a voltage of the battery 4. Further, the rotation speed of the engine 1 is inputted to the vehicle controller 5 to determine the operation state of the engine 1 (e.g., whether the engine 1 is driven or not), and the air-conditioning necessary electrical power A/C NEP calculated by the air-conditioning controller 7 is inputted to the vehicle controller 5.

At step S802, the air-conditioning usable electrical power A/C UEP is determined based on the rotation speed of the engine 1. At step S804, the air-conditioning usable electrical power UEP calculated at step S802 is output to the air-conditioning controller 7. In this case, a large part of the electrical power used in the air conditioner is a consumption power of the electrical compressor 41. At step S805, a control signal is output to the engine controller 3.

According to the first embodiment, when the rotation speed of the engine 1 is equal to or lower than a predetermined value, the air-conditioning capacity of the air conditioning unit 6, that is, the air-conditioning usable electrical power UEP is set lower, as compared with a case where the rotation speed of the engine 1 is higher than the predetermined value. Accordingly, the frequency for starting the engine only for charging the battery 4 is reduced. In addition, the frequency of increasing the rotation speed of the engine 1, for charging the battery, can be also reduced.

In this embodiment, when the rotation speed of the engine 1 is low, the consumption power consumed in the air conditioner can be restricted, so that a frequency where the residual charging degree of the battery 4 becomes lower than a charging start degree can be reduced. When the residual charging degree of the battery 4 is lower than the charging start degree, the battery 4 tends to be charged.

On the other hand, when the rotation speed of the engine is high, the air-conditioning usable electrical power A/C UEP can be set larger, thereby ensuring an amenity and a safety (visibility) in the passenger compartment.

Here, since the electrical compressor 41 is driven using the electrical power from the battery 4, the engine 1 is not necessarily required to be driven while the electrical compressor 41 is driven. Therefore, in this embodiment, fuel consumption in the engine 1 can be reduced, and the average fuel consumption efficiency in the vehicle running can be improved. Further, vibration noise and the exhaust amount of environmental polluting matter at the engine start time can be reduced.

Figure 8:
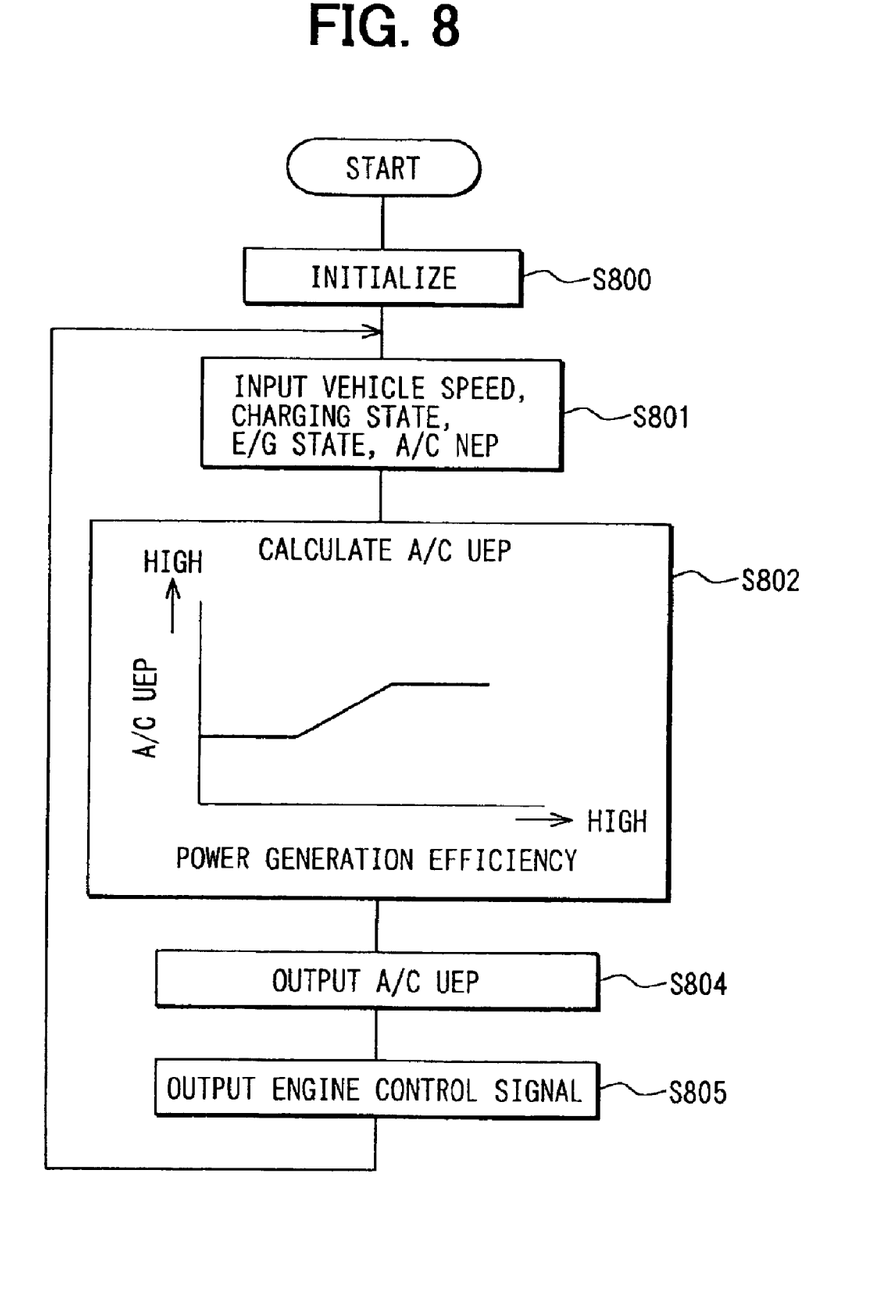
FIG. 8 is a flow diagram showing control processes of an air conditioner according to a second embodiment of the present invention.

A second embodiment will be described with reference to FIG. 8. In the above-described first embodiment of the present invention, when the rotation speed of the engine 1 is lower than the predetermined speed, the air conditioning capacity of the air conditioning unit 6 is reduced as compared with a case where the rotation speed of the engine 1 is higher than the predetermined speed. However, in the second embodiment, as shown at step S802 in FIG. 8, the air-conditioning usable electrical power A/C UEP is determined based on a power generation efficiency due to the engine 1. Hear, the power generation efficiency is a ratio of the power generation amount of the electrical motor generator 2 to the fuel consumption amount in the engine 1. Generally, when the rotation speed of the engine 1 decreases, the efficiency of the engine 1 decreases, and the power generation efficiency is decreased. The unit of the power generation amount is W, the unit of the fuel consumption amount is g/sec, and the unit of the power generation efficiency is J/g.

In the second embodiment, when the power generation efficiency due to the engine 1 is lower than a predetermined efficiency, the air-conditioning usable electrical power A/C UEP is set lower than in a case where the power generation efficiency due to the engine 1 is higher than the predetermined value. That is, when the power generation efficiency due to the engine 1 is lower than the predetermined efficiency, the air conditioning capacity of the air conditioning unit 6 is set lower. In the second embodiment, the other parts are similar to those of the above-described first embodiment.

Accordingly, when the power generation efficiency due to the engine 1 is low, the consumption power in the air conditioner can be restricted. Therefore, the frequency for starting the engine only for charging the battery 4 is reduced. In addition, the frequency of increasing the rotation speed of the engine 1, for charging the battery, can be also reduced. Thus, the average fuel consumption efficiency in the engine 1 can be improved, and vibration noise and the exhaust amount of environmental polluting matter at the engine start time can be reduced.

Although the present invention has been fully described in connection with preferred embodiments thereof with reference to the accompanying drawings, it is to be noted that various changes and modifications will become apparent to those skilled in the art.

For example, in the above-described embodiments of the present invention, the electrical compressor 41 is an integrated body where a compression mechanism is integrated to an electrical motor. However, only when the compression mechanism is driven by the electrical motor in the electrical compressor 41, the structure of the electrical compressor 41 can be suitably changed. For example, in the electrical compressor 41, the driving force generated in the electrical motor can be transmitted to the compression mechanism through a belt.

Such changes and modifications are to be understood as being within the scope of the present invention as defined by the appended claims.

What is claimed is:

1. An air conditioner for a hybrid vehicle, the hybrid vehicle having an engine for running the vehicle, an electrical motor generator for running the vehicle and for generating electrical power, and a battery for supplying electrical power to the electrical motor generator, the air conditioner comprising:

an air conditioning unit, to which electrical power is supplied from the battery, for performing air-conditioning operation in a passenger compartment of the vehicle; and a control unit for controlling operation of the air conditioning unit, wherein:

when a residual charging degree of the battery becomes equal to or lower than a target degree, the electrical motor generator is driven by the engine to charge the battery; and the control unit gradually decreases the air conditioning capacity of the air conditioning unit from a maximum air conditioning capacity to a minimum air conditioning capacity as the rotation speed of the engine decreases from a first predetermined rotation speed to a second predetermined rotation speed that is smaller than the first predetermined rotation speed.

2. The air conditioner according to claim 1, wherein:

the air conditioning unit includes a refrigerant cycle system in which refrigerant circulates; and the refrigerant cycle system includes an electrical compressor, operated using electrical power supplied from the battery, for compressing refrigerant.

3. An air conditioner for a hybrid vehicle, the hybrid vehicle having an engine for running the vehicle, an electrical motor generator for running the vehicle and for generating electrical power, and a battery for supplying electrical power to the electrical motor generator, the air conditioner comprising:

an air conditioning unit, to which electrical power is supplied from the battery, for performing air-conditioning operation in a passenger compartment of the vehicle; and a control unit for controlling operation of the air conditioning unit, the control unit including means for calculating a power generation efficiency of the engine, wherein:

when a residual charging degree of the battery becomes equal to or lower than a target degree, the electrical motor generator is driven by the engine to charge the battery; and when the power generation efficiency due to the engine is equal to or lower than a predetermined efficiency, the control unit decreases an air-conditioning capacity of the air conditioning unit, as compared with a case where the power generation efficiency due to the engine is higher than the predetermined efficiency.

4. The air conditioner according to claim 3, wherein:

the air conditioning unit includes a refrigerant cycle system in which refrigerant circulates; and the refrigerant cycle system includes an electrical compressor, operated using electrical power supplied from the battery, for compressing refrigerant.

5. The air conditioner according to claim 3, wherein the control unit gradually decreases the air conditioning capacity of the air conditioning unit from a maximum air conditioning capacity to a minimum air conditioning capacity as the power generation efficiency due to the engine decreases from the predetermined rotation speed.

6. The air conditioner according to claim 1, wherein:

when a rotation speed of the engine is lower than a first predetermined rotation speed, the control unit sets the air conditioning unit to a first air conditioning capacity; and when the rotation speed of the engine is greater than the first predetermined rotation speed, the control unit sets the air conditioning unit to a second air conditioning capacity, the second air conditioning capacity always being greater than the first air conditioning capacity.

7. The air conditioner according to claim 3, wherein:

when the power generation efficiency due to the engine is lower than the predetermined efficiency, the control unit sets the air conditioning unit to a first air conditioning capacity; and when the power generation efficiency due to the engine is greater than the predetermined rotation speed, the control unit sets the air conditioning unit to a second air conditioning capacity, the second air conditioning capacity always being greater than the first air conditioning capacity.

8. An air conditioner for a hybrid vehicle, the hybrid vehicle having an engine for running the vehicle, an electrical motor generator for running the vehicle and for generating electrical power, and a battery for supplying electrical power to the electrical motor generator, the air conditioner comprising:

an air conditioning unit, to which electrical power is supplied from the battery, for performing air-conditioning operation in a passenger compartment of the vehicle; and a control unit for controlling operation of the air conditioning unit, wherein:

when a residual charging degree of the battery becomes equal to or lower than a target degree, the electrical motor generator is driven by the engine to charge the battery; and when a rotation speed of the engine is lower than a predetermined rotation speed, the control unit sets the air conditioning unit to a first air conditioning capacity; and when the rotation speed of the engine is greater than the predetermined rotation speed, the control unit sets the air conditioning unit to a second air conditioning capacity, the second air conditioning capacity always being greater than the first air conditioning capacity.

9. An air conditioner for a hybrid vehicle, the hybrid vehicle having an engine for running the vehicle, an electrical motor generator for running the vehicle and for generating electrical power, and a battery for supplying electrical power to the electrical motor generator, the air conditioner comprising:

an air conditioning unit, to which electrical power is supplied from the battery, for performing air-conditioning operation in a passenger compartment of the vehicle; and a control unit for controlling operation of the air conditioning unit, the control unit including means for calculating a power generation efficiency, wherein:

when a residual charging degree of the battery becomes equal to or lower than a target degree, the electrical motor generator is driven by the engine to charge the battery;

when the power generation efficiency due to the engine is lower than a predetermined efficiency, the control unit sets the air conditioning unit to a first air conditioning capacity; and when the power generation efficiency due to the engine is greater than the predetermined rotation speed, the control unit sets the air conditioning unit to a second air conditioning capacity, the second air conditioning capacity always being greater than the first air conditioning capacity.

* * * * *